Aug. 30, 1960 H. A. PRICE 2,950,838
QUICK OPENING DOORS FOR FILTERS
Filed Aug. 8, 1958 2 Sheets-Sheet 1
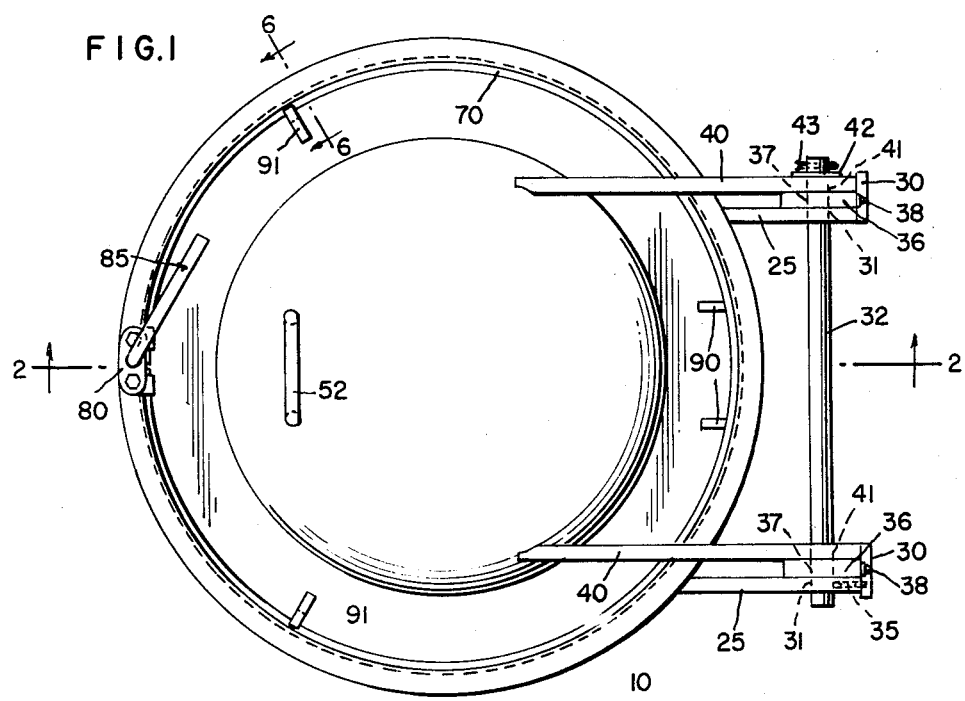
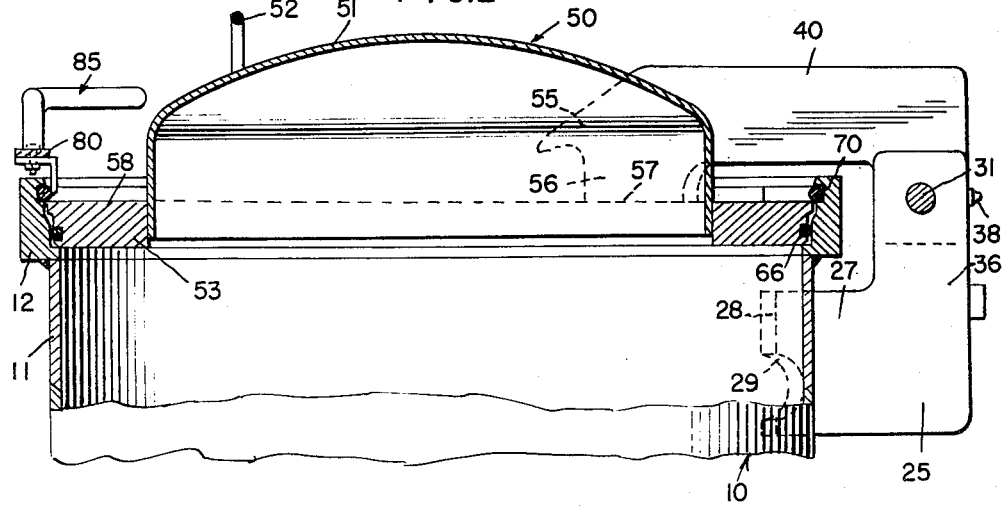
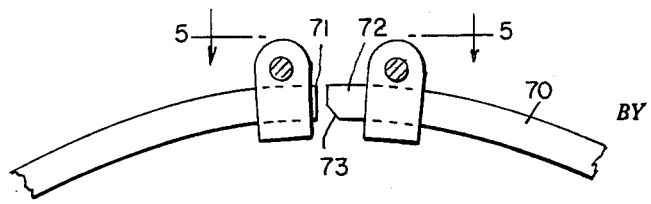
*INVENTOR:*
Harold A. Price
BY
*ATTY*

Aug. 30, 1960      H. A. PRICE      2,950,838
QUICK OPENING DOORS FOR FILTERS
Filed Aug. 8, 1958      2 Sheets-Sheet 2
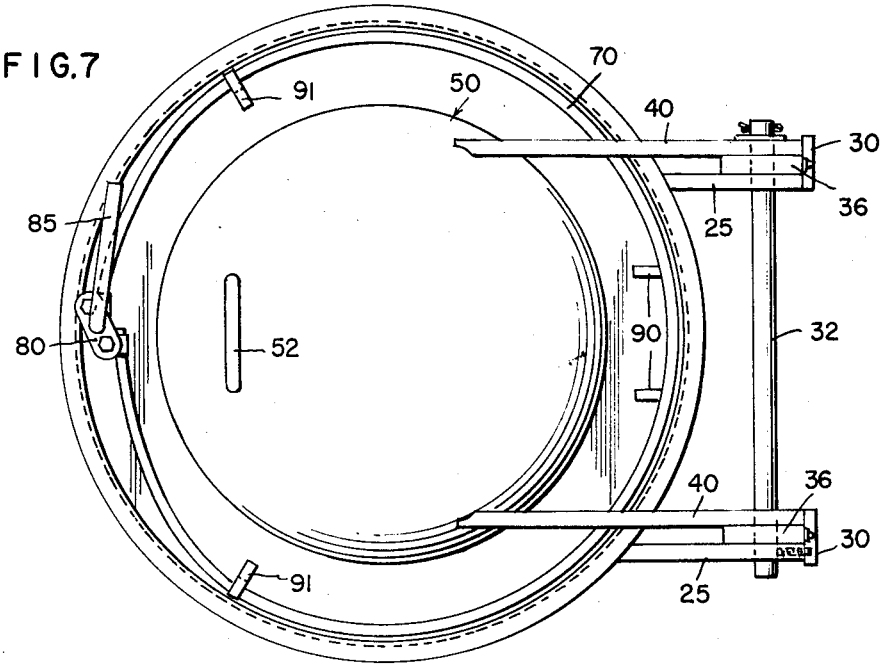
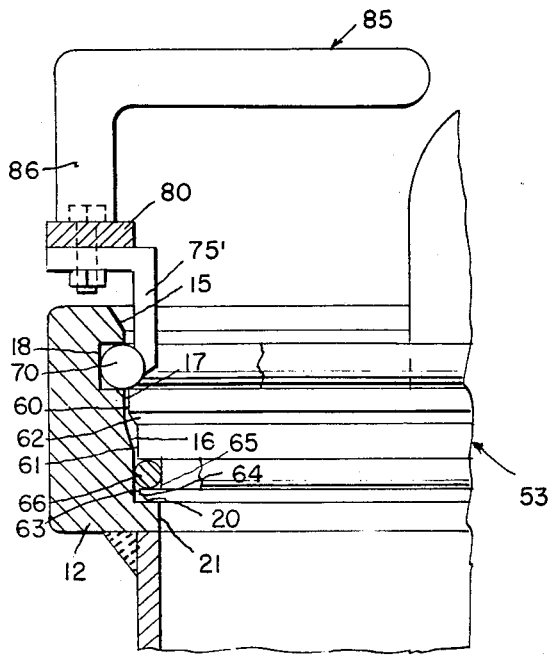
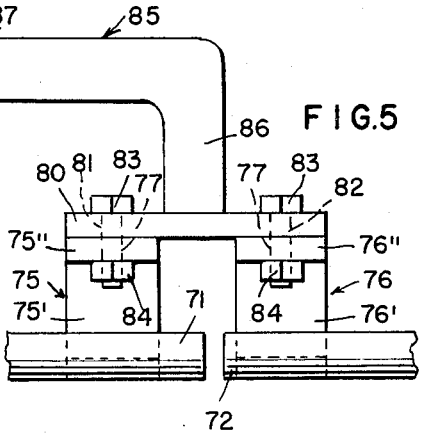
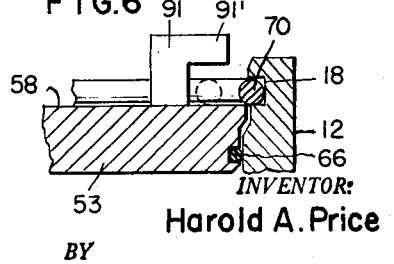
INVENTOR:
Harold A. Price
BY
ATTY

2,950,838
QUICK OPENING DOORS FOR FILTERS

Harold A. Price, Lafayette, Calif., assignor to Permanent Filter Corporation, Los Angeles, Calif., a corporation of California Filed Aug. 8, 1958, Ser. No. 754,037

2 Claims. (Cl. 220—46)

The present invention relates to a new and novel closure means for pressure vessels wherein it is necessary to provide a good seal between the closure means and the pressure vessel itself.

The present invention is particularly adapted for use in sealing liquid filter apparatus wherein liquid is circulated within a hollow vessel under substantial pressure. In such type of apparatus, it is necessary to periodically inspect and replace various portions of the filter mechanism, and accordingly it is essential that a closure means be provided which can be quickly and easily operated when necessary, and yet which will provide a very effective seal when in operative position.

In order to accomplish the desired results, it is considered preferable to provide a pivotally mounted closure means which, in the present application, is shown as being provided as the top of a substantially vertically upstanding hollow vessel. It is apparent that such pivotally mounted covers can be very easily pivoted into and out of operative position with a minimum of effort. However, such pivoted closure structures present certain difficult problems when it is necessary to provide very close clearances as is desired with pressure vessels wherein a reliable seal is required at all times during operation. Ordinary pivot closure mechanisms are not particularly suitable for use with pressure vessels due to the fact that the pivoted arrangement does not permit the desired degree of close clearance.

The present invention provides a novel arrangement wherein the closure means is pivoted about an axis disposed a substantial distance radially outwardly of the vessel itself, thereby enabling the closure means to move in an arc which does not cause the edges of the closure means to move in a direction which is at too great an angle with respect to the rim means of the vessel. In order to insure that with this type of arrangement the closure means will be properly aligned and disposed in accurate sealing position, both the closure means and the rim means are provided with a pair of tapered surfaces which interact to guide the closure means into the desired position when moved into sealing relationship with the rim means, and at the same time permits the closure means to be effectively pivoted into open position.

Due to the pressures existing within the vessel of the apparatus, it is necessary to provide a suitable locking means such that the closure means will be maintained in sealing position during operation. A very effective locking means is provided in the present invention in the form of an annular split resilient locking ring which is supported upon an upper portion of the closure means and is received within an annular groove formed in an inner surface of the rim of the vessel. When the ring is disposed in expanded position, its natural resiliency will maintain it in locking position such that a very positive locking means is provided which prevents the closure means from moving out of proper sealing relationship with respect to the rim of the vessel.

The opposite free ends of the locking ring are provided with a pair of brackets which are pivotally connected to opposite ends of a connector plate. A handle is attached to the connector plate such that by rotating the connector plate, the opposite ends of the locking ring will be moved relative to one another thereby deforming the locking ring. When the locking ring is so deformed, it can be easily moved out of locking position or into locking position as the case may be. Additional means are provided for retaining the locking ring in position relative to the closure means when the closure means is pivoted into inverted position. It is evident that this arrangement provides a very efficient and simple arrangement for locking the closure means throughout the circumference thereof for positively preventing any movement thereof with respect to the rim of the vessel.

A particular advantage of the present invention is the fact that the construction permits the proportions thereof to be easily varied in accordance with the various pressure ratings under which it may be operated. The construction of the invention apparatus is additionally quite simple and inexpensive, and yet provides a very sturdy structure which is rugged in operation and is adapted to withstand relatively high pressures existing within the vessels with which the closure means is employed.

An object of the present invention is the provision of a new and novel closure means particularly adapted for use with pressurized vessels.

Another object of the present invention is to provide a closure means for pressure vessels which is adaptable for use in applications requiring various pressure ratings and which provides relatively small clearances between the sealing components for maintaining an effective pressure seal.

A further object of the invention is to provide a new and novel closure means for pressure vessels which may be quickly and easily opened and closed, and locked in operative position or released therefrom.

Yet another object of the present invention is the provision of closure means for pressure vessels which is simple and inexpensive and has a compact construction and yet which is sturdy and reliable in operation.

Other objects and many attendant advantages of the invention will become more apparent when considered in connection with the accompanying specification and drawings wherein:

Fig. 1 is a top plan view of the closure means according to the present invention as employed with a substantially vertical upstanding pressure vessel;

Fig. 2 is a longitudinal section of the apparatus shown in Fig. 1 taken along line 2—2 of Fig. 1 looking in the direction of the arrows;

Fig. 3 is an enlarged view of a portion of the apparatus shown in Fig. 2;

Fig. 4 is a top view illustrating the construction of the free end portions of the locking ring of the apparatus;

Fig. 5 is a view taken along line 5—5 of Fig. 4 looking in the direction of the arrows;

Fig. 6 is a view taken along lines 6—6 of Fig. 1 looking in the direction of the arrows; and Fig. 7 is a view similar to Fig. 1 illustrating the locking ring in deformed position.

Referring now to the drawings wherein like reference characters designate corresponding parts throughout the several views, there is shown in Figs. 1 and 2 a pressure vessel indicated generally by reference numeral 10 having an upstanding substantially cylindrical wall 11, the upper edge of which is suitably secured as by welding to an annular rim 12 which extends completely about the open top of the vessel.

As seen most clearly in Fig. 3 of the drawings, flange 12 has formed on the inner face thereof a first tapered surface 15 which slopes downwardly and inwardly of the apparatus, and a second tapered surface 16 similarly slopes downwardly and inwardly. The two tapered surfaces 15 and 16 are joined to one another by a substantially flat vertically extending surface 17 having an annular groove 18 formed therein. Another flat vertically extending surface 20 joins tapered surface 16 with a shoulder 21 which extends substantially horizontally.

As seen most clearly in Figs. 1 and 2, a pair of similar hinge support brackets 25 is supported by the vessel, each of the brackets being substantially L-shaped in configuration including an upwardly extending portion 26 and a laterally extending portion 27. Portion 27 includes an inner vertically extending surface which is tapered such that it substantially conforms with the configuration of the outer surface of the wall 11 of the vessel, whereby it may be smoothly welded thereto. The inner end of portion 27 of each of the support brackets is provided with a cut-out portion 29 for relieving stresses in the member.

Each of brackets 25 has a laterally extending lug 30 secured to an intermediate portion thereof, as by welding or the like, which serves as a limit stop means for the closure member as will become more clearly apparent hereinafter. Each of upwardly extending projections 26 is provided with an aperture 31 formed therethrough, and a hinge pin 32 extends through and is mounted within openings 31.

As seen most clearly in Fig. 1, the lower end of the hinge pin as seen in this figure is maintained in position within the support bracket 25 by means of a set screw 35 threaded within a suitable opening provided in bracket 25, and in this manner the hinge pin is retained in the position shown in the drawing. Adjacent each of brackets 25 is disposed a bearing plate 36, each of the bearing plates having a central aperture 37 through which hinge pin 32 extends. A grease fitting 38 is mounted in each of the bearing plates and extends radially inwardly into communication with the aperture 37 formed through the bearing plates for providing lubrication for the hinge pin 32.

A pair of closure support brackets 40 each has openings 41 formed through one end thereof and through which hinge pin 32 extends whereby it is apparent that the closure support brackets 40 are pivotally mounted upon the hinge pin. A washer 42 is disposed about hinge pin 32 at the end opposite from the end engaged by set screw 35, and a cotter pin 43 extends through a suitable opening provided in the end of the hinge pin for maintaining the entire hinge structure in operative position as shown in the drawings.

As seen most clearly in Fig. 2, a closure means indicated generally by reference numeral 50 comprises a hollow dome-shaped member 51 having a U-shaped handle portion 52 secured to the upper surface thereof as by welding or the like. The closure means also includes an annular flange portion 53, the inner surface of which is in engagement with the lower outer surface of the dome portion 51 and which completely surrounds the lower portion of dome portion 51. Closure support brackets 40 each has an inner end portion 55 which is tapered to more or less conform to the outer configuration of dome portion 51 of the closure means and is suitably secured thereto as by welding. Closure support brackets 40 also have formed at the inner end thereof downwardly projecting portions 56, the lower edge 57 of which is secured to the upper surface 58 of flange portion 53 of the closure means as by welding or the like. It is accordingly apparent that dome portion 51 and flange portion 53 of the closure means are each rigidly secured to the closure support brackets 40, and may be additionally secured to one another as by welding in order to provide a rigid structure if desired.

As seen most clearly in Fig. 3, the outer surface of flange portion 53 of the closure means includes a first flat vertically extending surface 60 which is connected to a second flat vertically extending surface 61 by a downwardly and inwardly tapered surface 62. Another vertically extending flat surface 63 is formed at the lower portion of the outer surface of flange portion 53 and is connected to the undersurface of the flange by another downwardly and inwardly tapered surface 64. Surfaces 61 and 63 have formed therebetween an annular groove 65 which receives an O-ring sealing member 66 formed of neoprene rubber or other suitable sealing material.

The aforedescribed structure provides a very effective and novel manner of supporting the closure means of the present invention such that it is pivotally mounted about a pivot axis which is disposed a substantial distance radially outwardly of the vessel and the rim formed at the upper edge thereof. The tapered surfaces formed on the rim and the flange portion 53 of the closure means provide a means whereby the outer surface of the flange portion of the closure means is guided into proper and accurate seated position relative to the rim of the vessel, and it is apparent that when in such seated position, the undersurface of the flange adjacent tapered surface 64 rests upon shoulder portion 21 of the rim and sealing ring 66 is disposed in tight sealing engagement with the vertically extending flat surface of the rim adjacent shoulder portion 21. The intercooperation between the tapered surfaces on the closure means and on the rim and the novel disposition of the pivot axis for the closure means permit the adjacent surfaces on the outer surface of the flange and the inner face of the rim means to approach each other at a relatively small angle and insure proper seating of the closure means.

In order to provide an effective means for locking the closure means in operative position, a resilient split annular ring 70 formed of spring steel or similar material is supported upon the upper surface 58 of flange portion 53 of the closure means. The opposite end portions 71 and 72 of locking ring 70 are spaced from one another when in expanded operative position as seen, for example, in Figs. 1, 4 and 5 of the drawings, and in addition end portion 72 is provided with a tapered cut-out segment 73 which provides clearance between the adjacent end portions when they are moved relative to one another.

A pair of substantially L-shaped lugs 75 and 76 is secured to end portions 71 and 72 respectively of locking ring 70 at the lower portions of legs 75' and 76' as by welding or the like. The laterally extending legs 75" and 76" of the two lugs respectively are each provided with openings 77 formed therethrough. A connector plate 80 extends between lugs 75 and 76 and is provided with openings 81 and 82 formed therethrough adjacent opposite ends thereof and disposed in overlying relationship with openings 77 formed in lugs 75 and 76. Bolts 83 extend through the aligned openings 81, 82 and 77 for pivotally securing connector plate 80 to the lugs 75 and 76, nuts 84 being threaded on the lower threaded ends of bolts 83 for retaining them in position. A generally L-shaped handle 85 has the lower end portion 86 secured to the central area of connector plate 80 as by welding or the like, and the laterally extending portion 87 thereof is adapted to be grasped manually for rotating connector plate 80, thereby moving the opposite ends of the split locking ring with respect to one another.

The locking ring is shown in Figs. 1, 2 and 4 as being in its normal expanded locking position, and it should be noted that when in this position, bolts 83 which comprise the pivotal interconnection between the connector plate and the lugs 75 and 76 project downwardly at a point radially outwardly of locking ring 70, and in addition, the leg portions 75' and 76' of the lugs and connector plate 80 do not project radially outwardly beyond the outer surface of rim 12 of the vessel. This particular arrangement insures that the locking ring will be normally maintained in locking expanded position by the inherent resiliency of the locking ring itself.

When it is desired to unlock the apparatus in order to pivot the closure means into open position, the handle 85 is manually grasped and the outer end thereof is urged toward the outer periphery of the rim into the position shown in Fig. 7. Such movement of handle 85 causes rotation of connector plate 80 thereby moving the two free end portions of the locking ring with respect to one another and deforming the locking ring as seen in Fig. 7. Such deformation of the ring permits the ring to be removed throughout its entire length from groove 18 formed in the rim, thereby freeing the locking ring from the rim whereupon the closure means can be pivoted into open position. Similarly, when it is desired to again insert the locking ring in locking position, handle 85 may be rotated to deform the locking ring such that it may be again placed within groove 18 and rotated back into the position shown in Fig. 1 which causes the ring to expand outwardly into locking position.

A pair of lugs 90 is formed integral with the locking ring at points approximately diametrically opposite the free ends thereof and extends laterally thereof such that when the locking ring is supported upon surface 58 of the flange 53 of the closure means, lugs 90 will also rest upon surface 58 thereby additionally supporting the locking ring and providing stability therefor. In order to retain the locking ring in position relative to the closure means when the closure means is pivoted into open or inverted position, a pair of L-shaped brackets 91 is secured as by welding or the like to the surface 58 of flange portion 93. As seen most clearly in Fig. 6, brackets 91 are normally spaced from locking ring 70 when it is in locking position as shown in full lines, but when the apparatus is deformed into unlocking position, ring 70 will assume the position shown in dotted lines in Fig. 6, whereby it is evident that leg portion 91' of each of brackets 91 will limit movement of the ring away from the upper surface 58 of flange portion 53, thereby insuring that the ring will be maintained in proper position relative to the flange even when the closure means is in open inverted position.

It is apparent that locking ring 70 provides an efficient means whereby the closure means may be quickly and easily locked in sealing position or released therefrom, and that the locking ring is always prevented from being excessively displaced away from the flange portion of the closure means. When the closure means is pivoted into open position, closure support brackets 40 will move about the axis of pivot pin 32 until they engage the laterally extending lugs 30 secured to the hinge support brackets 25 whereby lugs 30 provide a limit stop means for preventing excessive pivotal movement of the closure means which might tend to cause undesired contact between the closure means and the outer surface of wall 11 of the vessel or other portions of the apparatus. It is also evident that the closure means can be quickly and easily pivoted about the axis of hinge pin 32 merely by grasping handle portion 52 on the upper surface of the dome part of the closure means.

It is apparent from the foregoing that there is provided a new and novel closure means which is especially adapted for use with pressure vessels and provides the desired close clearances necessary for obtaining an effective pressure seal. The device may be quickly and easily secured in locked position or released therefrom, and may be opened and closed with a minimum of effort. The apparatus is quite simple and inexpensive in construction and provides a very compact arrangement, yet it is very sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In combination, an upstanding substantially cylindrical open topped vessel having a circular rim formed at the upper end thereof, said rim having a pair of spaced tapered surfaces formed on the inner face thereof and a shoulder means thereon, said rim having an annular groove formed in said inner face intermediate said pair of tapered surfaces, supporting bracket means supported by said vessel and extending laterally outwardly therefrom, closure means pivotally supported by said bracket means for pivotal movement about an axis disposed radially outwardly of said vessel, said closure means including an annular flange having formed on the outer face thereof a pair of spaced tapered surfaces and having formed therein an annular groove intermediate said tapered surfaces, an annular sealing ring disposed within said last mentioned groove, a resilient locking ring received by said first mentioned groove and supported on the upper surface of said flange, said locking ring being split and having opposite free ends, operating means pivotally connected to said free ends for deforming said ring, and means on said closure means in position to engage said locking ring and retain the locking ring in position when said closure means is in inverted position.

2. Closure means for pressure vessels including a substantially circular rim means, said rim means having formed on the inner face thereof first and second tapered surfaces and a shoulder, said rim means also having an annular groove formed in said inner face thereof at a position intermediate said first and second tapered surfaces, closure means mounted for pivotal movement about an axis disposed radially outwardly of said rim means, said closure means including on the outer face thereof first and second tapered surfaces and having formed in said outer face a groove intermediate said first and second tapered surfaces, a substantially annular resilient locking ring supported on the upper surface of said closure means and being disposed within said first-mentioned groove, said locking ring being split and having opposite free ends, a lug connected to each of said free ends and extending upwardly therefrom, a connector plate having the opposite end portions thereof pivotally connected to said lugs, the pivot axis of each pivotal connection being fixed with respect to the associated lug, and a handle portion connected to substantially the central portion of the connector plate and extending laterally therefrom to permit release of said locking ring from said first-mentioned groove with a minimum amount of turning movement of said handle means.

References Cited in the file of this patent

UNITED STATES PATENTS

| | | |
|---|---|---|
| 1,363,616 | Reddie | Dec. 28, 1920 |
| 2,123,553 | Kaehler | July 12, 1938 |
| 2,684,779 | Rafferty | July 27, 1954 |
| 2,725,252 | Greer | Nov. 29, 1955 |
| 2,743,034 | Wheatley | Apr. 24, 1956 |